Dec. 25, 1956
R. E. THOMAS
2,775,696
MILLIVOLT GATING CIRCUIT
Filed July 14, 1953
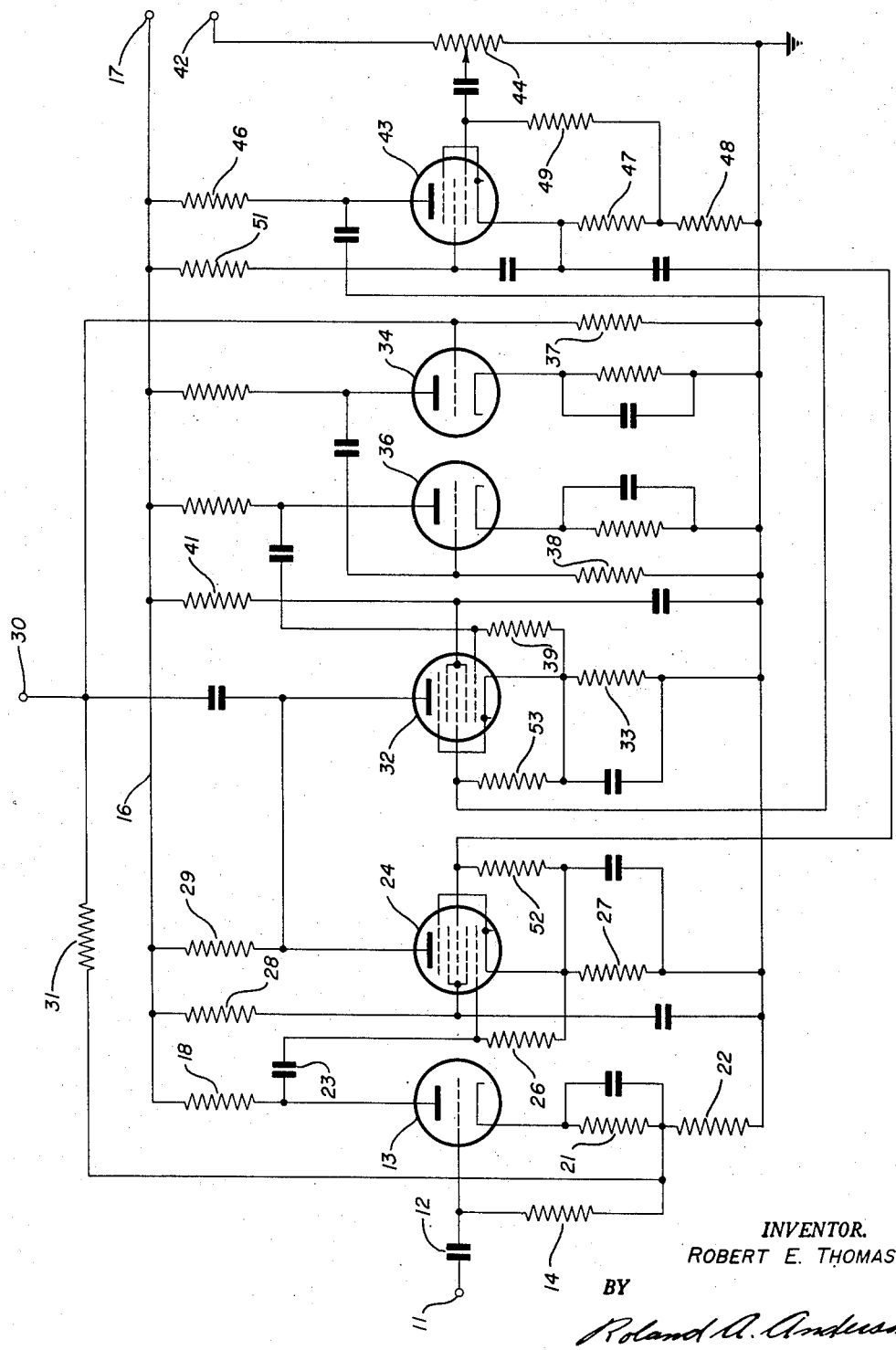
INVENTOR.
ROBERT E. THOMAS
BY
*Roland A. Anderson*
ATTORNEY.

United States Patent Office 2,775,696
Patented Dec. 25, 1956

2,775,696

MILLIVOLT GATING CIRCUIT

Robert E. Thomas, Walnut Creek, Calif., assignor to the United States of America as represented by the United States Atomic Energy Commission Application July 14, 1953, Serial No. 367,964

7 Claims. (Cl. 250—27)

The present invention relates in general to an improved gating circuit and in particular to a circuit adapted to gate or controllably pass low voltage signals, as for example in the millivolt range.

Electronic gates or gating circuits are widely employed for a variety of purposes and conventional circuits of this type employ an electronic valve such as a multigrid vacuum tube which has an input signal impressed on one grid or control electrode thereof and the gating signal impressed on another grid. Commonly, the gated signal is obtained from the tube anode; however, the gate signal causes the anode potential to swing markedly when the gate signal varies the tube from conducting to nonconducting state, and this voltage swing is sufficient to mask very small input signals to the gate tube so that conventional electronic gates are thereby limited as to the minimum input signal that they can satisfactorily handle. Consequently, small signals in the millivolt range previously could not be directly gated as they were overshadowed by the gating tube pulse at tube cut-off.

The present invention operates to gate signals of any size from large or normal amplitude to very small amplitudes by substantially eliminating anode potential variation when the tube is cut on and off by the gate signal. The present invention employs negative or degenerative feedback to reduce the variations in anode potential in the gating tube as long as same is conducting, and in addition provides means including a substitute gating tube for substantially eliminating output voltage variations from the gating signals.

It is an object of the present invention to provide an improved electronic gating circuit adapted to gate very small signals.

It is an object of the present invention to provide an improved gating circuit suppressing output voltage variations from gating signals.

It is an object of the present invention to provide an improved gating circuit including a substitute gating tube whereby the circuit output includes only gated signals without voltage pulses from the gating operation.

Various other advantages and possible objects of the invention will become apparent to those skilled in the art from the following description of a single preferred embodiment of the invention taken together with the attached drawing wherein the sole figure is a circuit wiring diagram of the gating circuit.

Considering now the circuit of the preferred embodiment of the invention and referring to the drawing, there is provided an input terminal 11, adapted to have impressed thereon from an external circuit, input signals to be gated or passed in accordance with some predetermined sequence. The input signal is applied through a capacitor 12 to the control electrode of a triode amplifier tube 13 with the grid thereof connected to the cathode through a resistor 14. Plate voltage is supplied to the tubes in the gating circuit through a bus 16 that is adapted for connection to an external plate supply at terminal 17 and the anode of amplifier tube 13 is connected to bus 16 through a resistor 18. The cathode of tube 13 is grounded through serially connected resistors 21 and 22 with the former nearest the cathode being capacitor by-passed and the juncture of the resistors is connected through the resistor 14 to the capacitor 12. The amplified signal from tube 13 is taken from the anode thereof and coupled through a capacitor 23 to the control grid of a pentagrid vacuum tube 24; a bias resistor 26 being connected between the control grid and cathode of tube 24.

Gating of the input signal at terminal 11 of the circuit is accomplished by gating tube 24 which, in addition to having the amplified input signal applied to the control grid thereof, further has a gate signal applied to the screen grid thereof. Additional connections of gating tube 24 include the grounding of the cathode through a by-passed resistor 27, the connection of a pair of isolating grids through a biasing resistor 28 to the positive bus 16 and capacitive grounding of these grids, and the connection of the tube anode to the positive bus 16 through a plate resistor 29. Tube 24 is switched between conducting and nonconducting states by gate signals applied to the screen grid of the tube and the tube output is taken directly from the anode thereof and applied through a capacitor to an output terminal 30. There is also connected to output terminal 30 a feedback loop which includes a resistor 31 and which is connected to the juncture of resistors 21 and 22 in the cathode circuit of amplifier tube 13. This connection applies the output signal at terminal 30 to the amplifier tube 180° out of phase with the input signal at terminal 11 so that the feedback is degenerative and the proportion of signal fed back is determined by the ratio of the values of resistors 31 and 22. This degenerative feedback which tends to effectively reduce the input signal or to decrease the amplification thereof will be seen to limit or minimize voltage changes in the plate resistor 29 of gating tube 24 so long as an input signal is applied, and thus the voltage variation of the anode of gating tube 24 and of output terminal 30 is minimized. Feedback in the gating circuit, as employed, will thus be seen to minimize the voltage swing at the output when the gate tube is gated; however, as the current passed by the gating tube 24 reduces to zero the feedback effect likewise reduces so that the gating tube anode voltage eventually swings to the same maximum value at gating tube cut-off.

Provision is made for preventing the voltage variation of the output terminal 30 at cut-off of tube 24 by a second or substitute gating tube 32 identical to tube 24 and having its anode directly connected to the anode of tube 24 and its cathode grounded through a by-passed resistor 33. Tube 32 is operated by what may be considered a 100% feedback amplifier and which includes a pair of triode vacuum tubes 34 and 36 which may be contained in a single envelope if desired. Connection is made from output terminal 30 to the control electrode of tube 34 and to ground through a resistor 37 while the output of tube 34 is capacitively coupled to the control electrode of tube 36 that is, in turn, grounded through a resistor 38. The output of tube 36 is taken from the anode thereof and capacitively coupled to the control electrode of substitute gating tube 32, while a resistor 39 is connected between the control electrode and cathode of tube 32. Amplifier tubes 34 and 36 are similarly connected in that the anodes of both are resistance coupled to positive bus 16 and the cathodes of both are grounded through capacitively by-passed resistors. Additional connections for the substitute gating tube 32 include the biasing of the isolating grids thereof from positive bus 16 through a resistor 41 and the grounding of same through a capacitor. The suppressor grids of both gating tubes 24 and 32 are connected to the tube cathodes, as shown.

The gating circuit is adapted to pass signals between input terminal 11 and output terminal 30 in response to gating signals and there is thus provided a gate input terminal 42 adapted to have gate signals impressed thereon from an external circuit attached to terminal 42. The gate signal at terminal 42 is applied to the control electrode of a pentode vacuum tube 43 which is connected as a paraphase amplifier to supply simultaneous gating signals of opposite polarity to gating tubes 24 and 32, and connection is made from the control electrode of tube 43 through a capacitor to the movable contact of a rheostat or potentiometer 44 that is connected between gate terminal 42 and ground. The anode of tube 43 is connected to the positive bus 16 through a plate resistor 46 and the tube cathode is grounded through serially connected resistors 47 and 48; the tube cathode is also connected through a resistor 49 to the control electrode. The suppressor grid of tube 43 may be directly connected to the cathode and the screen grid is biased from bus 16 through a resistor 51 while also being capacitively coupled to the cathode. The output of tube 43 comprises two oppositely phased identical signals obtained directly from the anode and cathode of the tube and, with positive gate signals applied to gate terminal 42, the anode of tube 43 is capacitively coupled to the screen grid of substitute gating tube 32 while the cathode of tube 43 is capacitively coupled to the screen grid of gate tube 24, the screen grids of tubes 24 and 32 being connected to the respective tube cathodes through resistors 52 and 53, respectively.

Considering now the operation of the improved gating circuit of the present invention as above described, and again referring to the drawings, input signals at terminal 11 are applied to the control grid of amplifier tube 13 and bias same through resistor 14 so that a negative signal proportionate thereto appears at the tube anode and is applied to the control electrode of gating tube 24. With a positive signal applied to the screen grid of gating tube 24 the signal applied to the control electrode varies the tube conduction to decrease the tube current and raise the anode potential which is reflected at output terminal 30 as an output signal proportionate to the input signal at terminal 11. Feedback is provided in the above-described portion of the circuit and a part of the output signal proportional to the ratio of resistances 31 and 22 is applied to the cathode of tube 13 to bias same oppositely to the input signal. This degenerative feedback reduces the overall amplification of tubes 13 and 24 and reduces voltage variations in the output of tube 24 which is desirable with low voltage input signals, however, the feedback factor reduces to zero as gating tube 24 is cut off by the gate signal so that the feedback actually only delays a maximum voltage variation in plate resistor 29 and thence at output terminal 30.

Prevention of a large voltage variation of terminal 30 at cut-off of tube 24 is accomplished by substitute gating tube 32 and associated elements including amplifiers 34 and 36. Substitute gating tube 32 is adapted to conduct alternately with gating tube 24 and to this end the gating signal applied at terminal 42 is applied to the desired degree through potentiometer 44 to the control electrode of paraphase amplifier 43. With a positive gating signal the current in tube 43 will increase so that the anode thereof will decrease in potential and the potential of the cathode will increase thereby producing oppositely phased gate signals that are coupled to the screen grids of gating tubes 24 and 32. With a positive gate signal applied from the cathode of tube 43 to the screen grid of gating tube 24 the tube conducts to pass signals, as described above, and the negative gate signal applied to the screen grid of substitute gating tube 32 maintains the tube in a nonconducting state. Cessation of the gate signal allows tube 43 to return to its normal state whereby the cathode potential thereof is negative or ground, and being applied to the screen grid of gating tube 24 cuts off same, while the positive anode potential of tube 43 applied to the screen grid of tube 32 allows same to conduct.

Substitute gating tube 32 is thus cut off during conduction of gating tube 24 and termination of the gate signal causes the screen grid of substitute gating tube 32 to assume a positive potential so that the tube can conduct. The signal that causes tube 32 to conduct is obtained from output terminal 30 and in this respect note that as gating tube 24 ceases conduction the anode potential starts to rise as the plate current falls off and thus an increased voltage is applied to the control electrode of tube 34. The resultant negative plate signal of tube 34 is applied to the control electrode of tube 36 to reduce the conduction of same and produce a positive plate signal that is applied to the control electrode of substitute gating tube 32 thereby causing this tube to conduct. As substitute gating tube 32 conducts, it draws current through the common plate resistor 29 so that the anode potential of tubes 24 and 32 remains constant and no voltage variation is reflected at the output terminal 30 when gating tube 24 is rendered nonconducting.

In summary, it is noted that large plate voltage variations of the gating tube is prevented by the present invention so that small or even minute signals may be effectively gated. The normal plate voltage variation at tube cut-off is substantially eliminated as feedback limits same until actual nonconduction of the gating tube 24 and timely conduction of substitute gating tubing 32 causes the same basic tube current to flow through the common plate resistor so that no cut-off plate voltage swing results. It is convenient to make certain of the circuit elements variable for adjusting operating characteristics and particularly a potentiometer may be employed as the bias resistor 33 of tube 32 with the lower end of control electrode resistor 34 connected to the movable contact thereof.

Clearly, the invention as described is adapted to preclude the gate signals in a gating circuit from appearing in the output circuit to interfere with or possibly mask the gated signals and while the invention has been described with respect to but a single preferred embodiment it will be appreciated by those skilled in the art that numerous modifications and variations are possible within the spirit and scope of the invention so that no limitation is intended by the description of the invention but instead reference is made to the appended claims for a precise definition of the invention.

What is claimed is:

1. An improved gating circuit comprising a pair of like gating tubes having a common plate resistor and each having control and screen electrodes, means impressing signals to be gated upon the control electrode of the first of said gating tubes, means impressing positive gating signals on the screen grid of said first tube and simultaneously impressing negative gating signals on the screen grid of said second tube, and means impressing upon the control electrode of the second of gating tubes a signal proportional to the anode potential thereof whereby voltage variation across the common plate resistor is minimized.

2. An improved gating circuit comprising a first gating tube having a control electrode adapted to have impressed thereon signals to be gated and a screen electrode adapted to have impressed thereon gating signals, a second substitute gating tube having a control electrode adapted to have impressed thereon a potential proportional to the anode potential of said first gating tube and a screen electrode adapted to have impressed thereon inverted gating signals of said first gating tube, and a common plate resistor for said first gating tube and second substitute gating tube whereby the voltage thereacross does not vary with cut-off of said first gating tube.

3. An improved gating circuit comprising an input terminal adapted to receive signals to be gated, first and second multigrid vacuum tubes having a common plate resistor, an output terminal connected to the plates of said first and second tubes, means impressing gate signals upon the screen electrode of said first tube and simultaneously impressing gate signals of opposite polarity upon the screen electrode of said second tube, means connecting said input terminal to the control electrode of said first tube, and a hundred percent negative feedback amplifier including said second tube and a vacuum tube having its output applied to the control electrode of said second tube whereby said first and second tubes alternately conduct in response to said gate signals to eliminate voltage variation at said output terminal from cut-off of said first tube.

4. An improved low voltage gating circuit comprising a gating tube having control and screen electrodes, an amplifier adapted to receive signals to be gated and connected to impress the output thereof upon the control electrode of said gating tube for varying the plate potential thereof, a degenerative feedback loop connected between the output of said gating tube and the input of said amplifier, a substitute gating tube having control and screen electrodes, a common plate resistor for said tubes, means impressing gating signals on the screen electrodes of said gating tube and substitute gating tube with the gating signals on separate tubes being of opposite polarity, and a hundred percent feedback loop connected between the output of said gating tube and the control electrode of said substitute gating tube.

5. An improved millivolt gating circuit comprising an input terminal adapted to have impressed thereon signals to be gated, an amplifier connected to said input terminal for amplifying signals received thereat, first and second multielectrode vacuum tubes having the output of said amplifier impressed on a control electrode of said first tube and a common plate resistor, an output terminal connected to the plates of said vacuum tubes, a degenerative feedback loop connected between said output terminal and said amplifier, means impressing gating signals on screen electrodes of said first and second vacuum tubes with signals on separate tubes being of opposite polarity whereby said first tube gates signals between said input and output terminals, and a hundred percent feedback amplifier connected between said output terminal and the control electrode of said second vacuum tube whereby said second vacuum tube conducts upon cut-off of said first vacuum tube for eliminating output voltage variation therefrom.

6. An improved gating circuit comprising first and second gating tubes having a common plate resistor and each including control and screen electrodes, means impressing signals to be gated upon the control electrode of said first gating tube, an output terminal connected to the plate electrodes of said first and second gating tubes, a paraphase amplifier having two outputs, means impressing gating signals upon said paraphase amplifier, means connecting the outputs of said paraphase amplifier to individual screen electrodes of said first and second gating tubes whereby said tubes are alternately gated for conduction, and feedback means connected between said output terminal and the control electrode of said second gating tube whereby said gating tubes alternately conduct and preclude output voltage variations from the gating signals.

7. An improved millivolt gating circuit comprising a pair of identical pentagrid gating vacuum tubes having a common plate resistor, an input triode vacuum tube having an input terminal coupled to the control electrode thereof for receiving signals to be gated and having its anode capacitively coupled to the control electrode of said first gating tube, an output terminal capacitively coupled to the anode of said first gating tube and resistance-coupled to the cathode circuit of said input tube for degenerative feedback thereto, a paraphase amplifier tube adapted to have gate signals impressed on the control means thereof and having the cathode and anode thereof capacitively coupled to the screen electrodes of said first and second gating tubes respectively for gating said tubes, and an amplifier having an input connected to said output terminal and an output connected to the control electrode of said second gating tube whereby said gating tubes alternately conduct to impress upon the output terminal only gated input signals.

References Cited in the file of this patent
UNITED STATES PATENTS

| | | |
|---|---|---|
| 2,403,984 | Koenig et al. | July 16, 1946 |
| 2,461,456 | Usselman | Feb. 8, 1949 |
| 2,506,770 | Braden | May 9, 1950 |